United States Patent [19]

Bartee et al.

[11] Patent Number: 4,922,672
[45] Date of Patent: May 8, 1990

[54] SNAP-ON UNDERFLOOR PRESET

[75] Inventors: Edward c. Bartee, Fairfield, Ohio; Donald L. Chapman, Liberty, Ind.

[73] Assignee: Square D Company, Palatine, Ill.

[21] Appl. No.: 321,613

[22] Filed: Mar. 10, 1989

[51] Int. Cl.⁵ ............................................. E04B 5/48
[52] U.S. Cl. ...................................... 52/221; 174/48
[58] Field of Search ................ 52/221; 174/48, 49; 220/3.2, 4 A

[56] References Cited

U.S. PATENT DOCUMENTS

| Re. 28,035 | 6/1974 | Fork | 174/49 |
|---|---|---|---|
| 2,811,574 | 10/1957 | Guerrero | 174/57 |
| 3,053,014 | 9/1962 | Fork | 50/127 |
| 3,514,525 | 5/1970 | Flachbarth et al. | 174/49 |
| 3,609,210 | 9/1971 | Guritz | 174/49 |
| 3,903,666 | 9/1975 | Fork | 52/221 |
| 3,932,696 | 1/1976 | Fork et al. | 174/48 |
| 3,943,272 | 3/1976 | Carroll et al. | 52/221 X |
| 3,973,366 | 8/1976 | Balane et al. | 52/221 X |
| 4,178,469 | 12/1979 | Fork | 174/48 |
| 4,237,666 | 12/1980 | Kohaut | 52/221 |
| 4,338,484 | 7/1982 | Littrell | 174/48 |
| 4,341,919 | 7/1982 | Kohaut | 174/48 |
| 4,408,090 | 10/1983 | Kohaut | 174/48 |
| 4,443,654 | 4/1984 | Flachbarth et al. | 174/48 |
| 4,454,692 | 6/1984 | Ault | 52/221 |
| 4,465,897 | 8/1984 | Albrecht | 174/48 |
| 4,507,900 | 4/1985 | Landis | 52/221 |
| 4,529,833 | 7/1985 | Weis | 174/48 |
| 4,591,656 | 4/1986 | Mohr | 174/48 |
| 4,603,523 | 8/1986 | Albrecht et al. | 52/221 |

Primary Examiner—Carl D. Friedman
Attorney, Agent, or Firm—James Earl Lowe, Jr.; Jose W. Jimenez; Larry I. Golden

[57] ABSTRACT

A preset insert construction is provided for a raceway system designed for placement in a concrete floor. A duct has an access opening defined in a top wall thereof. The access opening has a primary perimeter and a plurality of notches extending beyond the primary perimeter. A preset insert has an extension collar defining an insert opening therethrough similar in size and shape to the access opening. A support flange extends outwardly from a lower end of the collar. A plurality of locking tabs extend downward from the collar below the support flange. Each locking tab includes an outwardly extending locking lip portion. The locking tabs are located relative to each other in a pattern corresponding to the notches of the access opening, and are located on the preset insert so that when the tabs are initially inserted into the notches, the insert opening is partially out of alignment with the access opening. The preset insert is then moved relative to the duct to an aligned position wherein the insert opening is aligned with the access opening and the wall of the duct is located between the support flange and the locking lips of the preset insert. Resilient latching barbs are provided for automatically latching the preset insert in place relative to the duct when it is moved to its aligned position.

20 Claims, 3 Drawing Sheets

4,922,672

SNAP-ON UNDERFLOOR PRESET

This invention relates generally to preset extensions for use with an electrical raceway system designed to be placed in a floor.

BACKGROUND OF THE INVENTION

There are several well known types of electrical raceway systems which are designed to be placed in a floor. There are, for example, "underfloor raceways" as defined in Article 354 of the National Electrical Code and "cellular metal floor raceways" as defined in Article 356 of the National Electrical Code.

Preset extensions are vertical extensions which are attached to the top of a duct of a raceway system and extend up to near a floor level for permitting access to electrical cables contained in the duct and connection of those cables to power outlets and the like. The term "preset" indicates that the extension is assembled with the duct prior to the pouring of a concrete floor on top of the duct. This is contrasted to "after set" extensions which are assembled with the duct after concrete is poured, thus requiring the breaking away and removal of a portion of the hardened concrete. The preset extension is also sometimes referred to as a preset insert or simply as a preset.

Preset extensions designed for use in either of the two mentioned raceway systems, and conceivably in some other systems, can generally be referred to as preset extensions for use with a raceway system designed to be placed in a floor.

As used herein, the simple term "duct" or "raceway", or the phrase "raceway system for placement in a floor" or the like are intended to refer in a generic sense to an "underfloor raceway" or to a "cellular metal floor raceway" or both. Where the term "underfloor duct" or "underfloor raceway" is used, it is intended as a reference to the particular type of system defined in Article 354 of the National Electrical Code.

The preset extension disclosed in this application is designed primarily for use with an underfloor duct as part of an underfloor raceway, and is illustrated and described as such herein. It can, however, be used as part of a cellular metal floor raceway system and thus is generically referred to as a preset extension for an electrical raceway system to be placed in a floor.

Underfloor duct is an electrical raceway system designed to be imbedded in the concrete floor of offices, classrooms, laboratories, manufacturing areas, supermarkets, etc., for the purpose of providing an enclosed raceway for wires and cables from their originating panel to their point of use. Such an underfloor raceway system includes two types of ducts, namely feeder ducts and distribution ducts. Complimenting these two types of ducts are junction boxes, support couplers and supports, horizontal and vertical elbows, power and telephone outlets and numerous cast and sheet metal fittings such as conduit adapters, change of direction duct runs, "Y" takeoffs, etc.

Typical preset extensions designed for use with such underfloor ducts are either integrally constructed with the duct, or are fixedly attached to the duct at the factory. This is particularly true of preset extensions utilized with single cell ducts. An example of a typical preset extension utilized with single cell ducts is seen in U.S. Pat. No. 3,514,525 to Flachbarth et al.

Also, the prior art includes a number of preset extensions utilized primarily with multi-cell ducts and particularly with multi-cell cellular metal flooring, which preset extensions are designed to be mounted in the field typically with pop rivets or other such fasteners. Examples of such extensions are seen in U.S. Pat. No. Re. 28,035 to Fork, U.S. Pat. No. 3,609,210 to Guritz, U.S. Pat. No. 4,454,692 to Ault, and U.S. Pat. No. 4,338,484 to Littrell.

SUMMARY OF THE INVENTION

The present invention provides a preset insert construction utilizing a system of locking tabs on the preset insert which fit within a hole pattern cut in the duct so that the preset insert can be assembled with the duct in the field.

The preset insert construction of the present invention includes a duct having an access opening defined in a wall thereof. The access opening has a primary perimeter and a plurality of notches extending beyond the primary perimeter.

A preset insert has an extension collar defining an insert opening therethrough similar in size and shape to the access opening. A support flange extends outwardly from a lower end of the collar. A plurality of locking tabs extend downward from the collar below the support flange. Each tab includes an outwardly extending locking lip portion.

The tabs of the preset insert are located relative to each other in a pattern corresponding to the notches in the access opening of the duct. The tabs are located on the preset insert so that when the tabs are inserted into the notches of the access opening, the insert opening is partially out of alignment with the access opening. The insert is then moved relative to the duct either by hand or with the aid of a hammer so that the insert is in an aligned position wherein the insert opening is aligned with the access opening. In this aligned position, the wall of the duct is located between the support flange and the lips of the locking tabs.

A resilient latching means automatically latches the preset insert in place relative to the duct when the preset insert is moved to a its aligned position Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
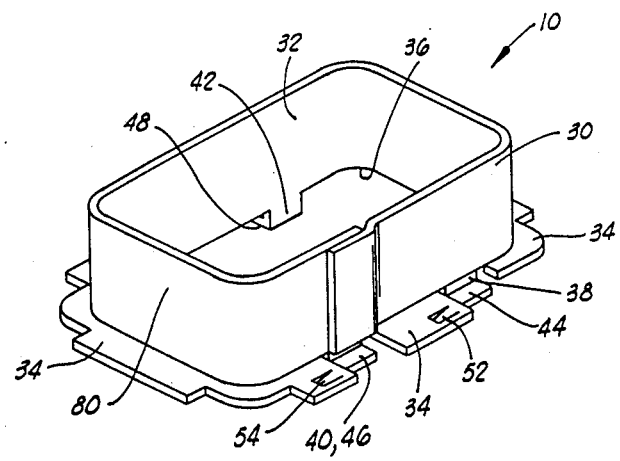
FIG. 1 is an isometric view of a preset insert
Figure 2:
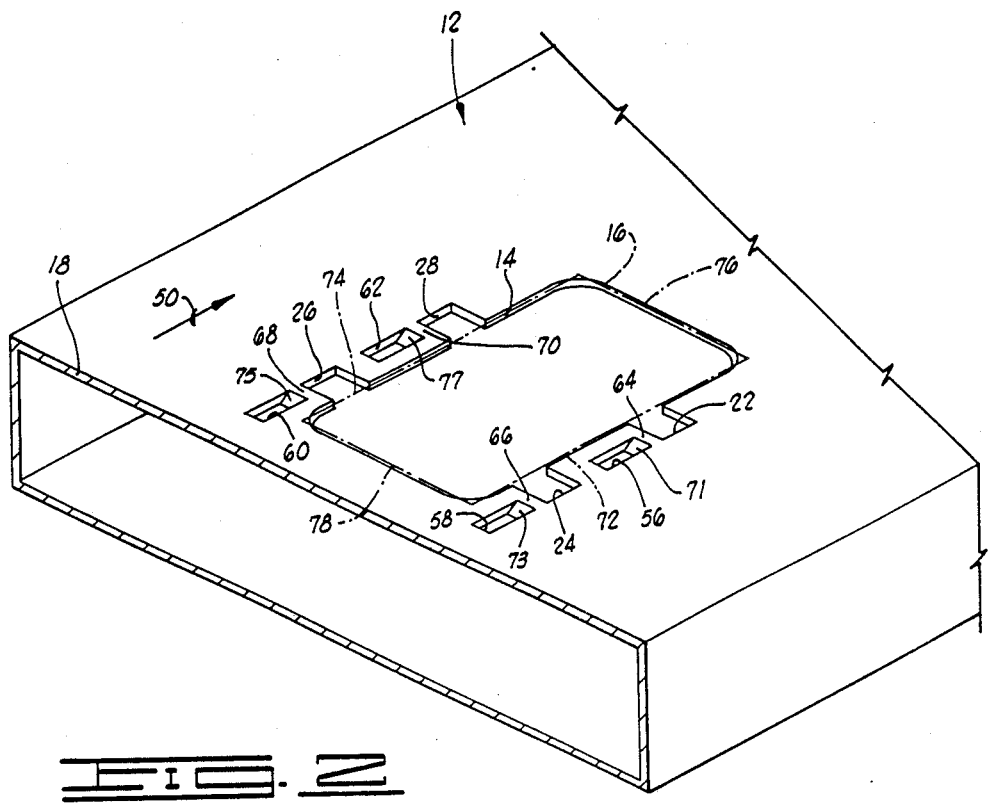
FIG. 2 is an isometric view of a duct having an access opening therein

Referring now to the drawings, FIG. 1 is an isometric view of a preset insert generally designated by the numeral 10. FIG. 2 illustrates a duct 12 having an access opening 14 defined in a top wall 18 thereof.

It will be appreciated that the duct 12 will have a number of access openings such as 14 located therein and spaced at predetermined intervals along the length thereof.

Access opening 14 has a generally rectangular primary perimeter 16 having somewhat rounded corners. Primary perimeter 16 is indicated in phantom lines. Access opening 14 further includes a plurality of notches 22, 24, 26 and 28 extending beyond the primary perimeter 16.

The preset insert 10 has an extension collar 30 defining an insert opening 32 therethrough similar in size and shape to the primary perimeter 16 of access opening 14.

Preset insert 10 includes a support flange 34 extending outwardly from a lower end 36 of collar 30.

A plurality of locking tabs such as 38, 40 and 42 extend downward from the collar 30 below the support flange 34. There are four such locking tabs, but only three are visible in FIG. 1. Each of the locking tabs includes outwardly extending locking lip portions 44, 46 and 48.

Figure 3:
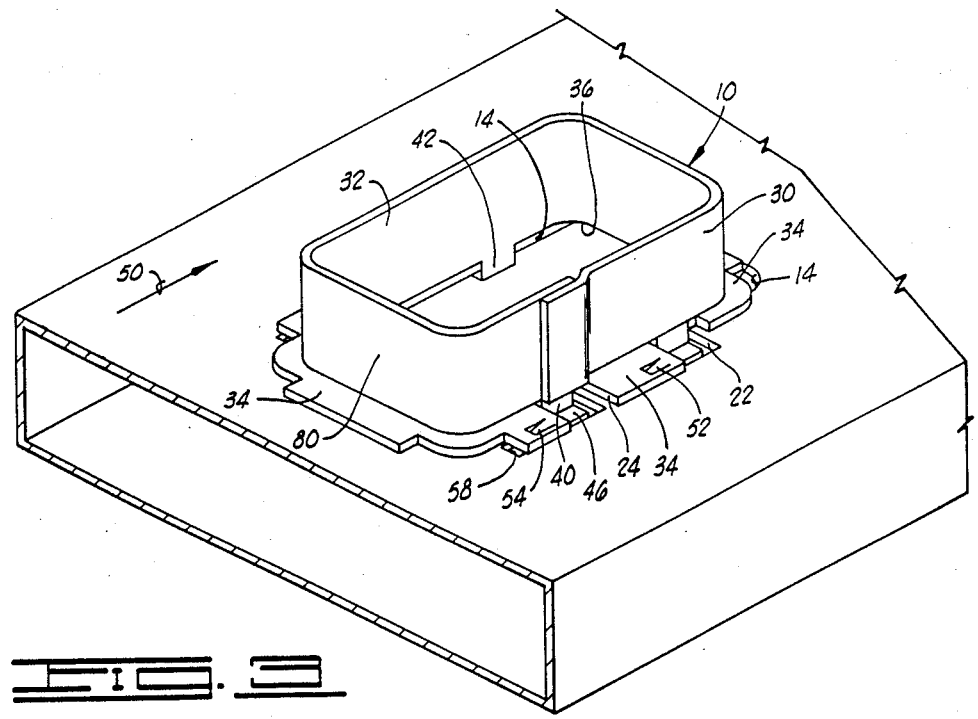
FIG. 3 shows the preset insert of FIG. 1 in its initial non-aligned position when first inserted into the access opening of the duct of FIG. 2.

The tabs 38 through 42 are located relative to each other in a pattern corresponding to the notches 22 through 28, and are located on the preset insert 10 so that when the tabs 38 through 42 are inserted into the notches 22 through 28, the insert opening 32 is partially out of alignment with the access opening 14 as shown in FIG. 3. Subsequently, the preset insert 10 is slid forward in a direction indicated by the arrow 50 in FIG. 2 to an aligned position as shown in FIG. 4.

This sliding movement can be described as linearly displacing or sliding the preset insert 10 from its non-aligned first position to its aligned second position in the direction 50 generally parallel to the top wall 18.

Figure 4:
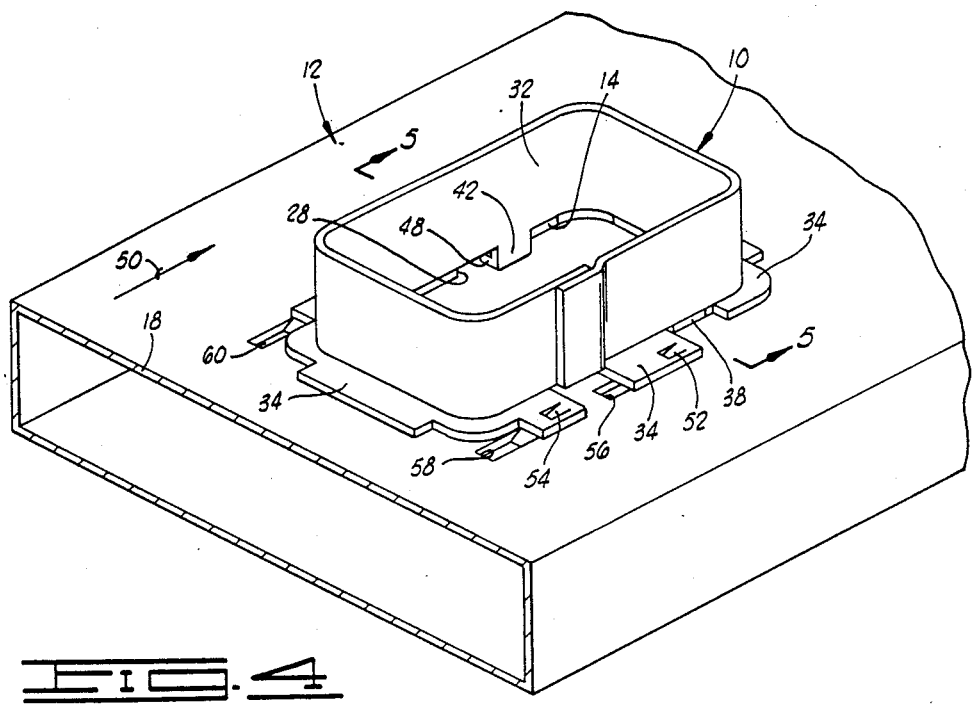
FIG. 4 shows the preset insert of FIG. 1 after being moved to its final aligned position relative to the access opening of the duct of FIG. 2.

In the aligned position as shown in FIG. 4, the insert opening 32 is substantially aligned with the access opening 14, with the top wall 18 of duct 12 being located between the support flange 34 and the locking lips 44 through 48 of the tabs 38 through 42.

Figure 5:
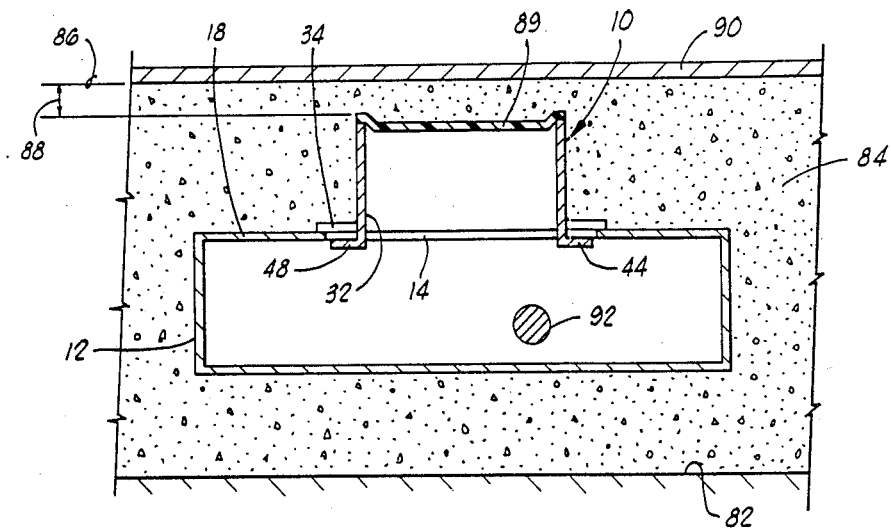
FIG. 5 is a section elevation view taken along line 5—5 of FIG. 4, showing the duct and preset insert assembled together and in place within a poured concrete floor.

The relative position of the top wall 18 and the flange 34 and locking lips 44 through 48 are best seen in the elevation section view of FIG. 5. When the preset insert 10 is assembled with the duct 12, the support flange 34 is located above the plane of top wall 18 and the locking lips 44 through 48 are located below the plane of the top wall 12.

The preset insert 10 further includes a plurality of flexible barbs such as 52 and 54 formed in the support flange 34 and extending downward therefrom. There preferably are four such barbs, two on each side of the preset insert 10. The barbs 52 and 54 can generally be described as a resilient latching means 52,54 operably associated with the duct 12 and the preset insert 10 for automatically latching the preset insert 10 in place relative to the duct 12 when the preset insert 10 is moved to an aligned position as shown in FIG. 4.

The barbs such as 52 and 54 are located on the support flange 34 so that when the preset insert 10 is moved to its aligned position the barbs will snap into the notches 22 through 28 thus latching preset insert 10 to the duct 12.

The top wall 18 of duct 12 includes a plurality of recesses 56, 58, 60 and 62 in which the barbs such as 52 and 54 are initially received when the tabs 38 through 42 are initially inserted into the notches 22 through 28 as shown in FIG. 3. Each of these recesses 56 through 62 is spaced from an associated one of the notches 22 through 28 by bridging portions 64, 66, 68 and 70, respectively, of the top wall 18. The barbs such as 52 and 54 must deflect over these bridging portions 64 through 70 as the preset insert 10 is moved from its initial non-aligned position to its final aligned position. Tapered surfaces 71, 73, 75 and 77 join the recesses 56 through 62 to the bridging portions 64 through 70.

Referring again to the general arrangement of the access opening 14, it is noted that the primary perimeter 16 of access opening 14 is generally rectangular in shape as indicated in phantom lines, and has two generally parallel longer sides 72 and 74 and two generally parallel shorter sides 76 and 78. The longer sides 72 and 74 are preferably arranged generally parallel to the length of duct 12, and the notches 22 through 28 are arranged in pairs of opposed notches such as first pair 22 and 28 and second pair 24 and 26 which are disposed in the longer sides 72 and 74.

The locking tabs 38 through 42 and the latch means 52,54 can collectively be referred to as a locking means operably associated with the duct 12 and the preset insert 10 for automatically locking the preset insert 10 to the duct 12 when the preset insert 10 is moved to its aligned second position as shown in FIG. 4. The locking lips 44 through 48 can generally be referred to as lateral locking projections 44 through 48.

It is noted that in its broader aspects the present invention could be applied to other shapes of preset inserts. For example, the preset insert could have a circular extension collar and have a plurality of locking tabs with locking lips extending substantially radially outward from the locking collar. An access opening could be constructed in the duct having a generally circular primary perimeter with a plurality of notches extending radially outward from the circular primary perimeter for receipt of the locking tabs of the round extension collar. Then, the round extension collar could be locked in place by a rotational motion which would move the locking tabs under the wall of the duct. Resilient latching means similar to the barbs 52 and 54 could be utilized with such a round preset extension construction.

The assembly of the preset insert 10 with the access opening 14 of duct 12 is generally performed as follows. The tabs 38 through 42 of preset insert 10 are inserted into the notches 22 through 28 to define a first, non-aligned position of the preset insert 10 relative to the duct 12 as shown in FIG. 3 with the support flange 34 located above the plane of top wall 18 and with the locking lips 44 through 48 located below the plane of the top wall 18 with those locking lips 44 through 48 still located directly below the notches 22 through 28.

Then, the preset insert 10 is moved in the direction of arrow 50 to its second aligned position as shown in FIG. 4. This is preferable performed manually with the aid of a manually operating impacting tool (not shown) such as a hammer. A block of wood (not shown) may be placed against an end wall 80 of preset insert 10 and the block of wood then impacted with a hammer to move the preset insert 10 in the direction 50.

The resilient barbs such as 52 and 54 which must be deflected over the bridging portions 64 through 70 resiliently resist movement of the preset insert 10 from its non-aligned first position to its aligned second position.

When the preset insert 10 is moved to its second aligned position as illustrated in FIG. 4, the resilient barbs such as 52 and 54 will snap into place within the notches such as 22 and 24 after they pass over the bridging portions 64 and 66, thus resiliently latching the preset insert 10 in its second aligned position.

As best seen in FIG. 5, after the duct 12 is assembled with the preset insert 10, the duct 12 will be set in place above a floor base 82. The underfloor duct 12 will typically be held in place relative to floor 82 by various support legs (not shown). Then a concrete floor 84 is poured around the duct 12 and preset inserts 10. The concrete floor 84 is poured up to an elevation 86 providing a relatively thin layer 88 of concrete over the top of preset insert 10. The top opening of preset insert 10 is closed by a removable closure cap 89 which snaps in place therein prior to pouring the concrete.

The concrete 84 will typically be covered by tile or other floor covering 90.

As will be understood by those skilled in the art, when it is desired to locate an electrical outlet on top of the tile floor 90, one of the preset extensions 10 will be located, and the tile 90 and the thin layer 88 of concrete located immediately above the preset extension 10 will be broken away. The closure cap 89 will be removed so as to provide access down through the preset extension 10 into the duct 12 to access electrical cables such as 92 located therein.

The preset insert construction of the present invention provides several advantages as compared to conventional preset extensions which must be assembled with the duct at the factory prior to shipment to the job site.

With the preset insert construction of the present invention, the duct 12 can be shipped separate from the preset inserts 10 thus providing significant economies due to the fact that the duct 12 can be packaged much more efficiently and handled much more easily without the preset inserts 10 in place.

Additionally, the use of separable preset inserts 10 allows the manufacturer to provide the construction contractor with the option of assembling the preset inserts 10 and duct 12 at the construction site, thus allowing the products to be sold at a lesser cost than would be required for products which have already been assembled prior to shipping.

Of course, with the preset insert construction of the present invention, the preset inserts 10 can also be assembled with the duct 12 in the factory prior to shipping if the customer so desires.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A preset insert construction for a raceway system for placement in a floor, comprising:
    a duct having an access opening defined in a wall thereof, said access opening having a primary perimeter and a plurality of notches extending beyond said primary perimeter;
    a preset insert having:
        an extension collar defining an insert opening therethrough similar in size and shape to said access opening;
        a support flange extending outwardly from a lower end of said collar;
        a plurality of locking tabs extending downward from said collar below said support flange, said tabs each including an outwardly extending locking lip portion; and
    wherein said tabs are located relative to each other in a pattern corresponding to said notches, and are located on said preset insert so that when said tabs are inserted into said notches said insert opening is partially out of alignment with said access opening, and so that when said insert is then moved relative to said duct to an aligned position wherein said insert opening is aligned with said access opening said wall of said duct is located between said support flange and said lip portions of said tabs.

2. The preset insert construction of claim 1, further comprising:
    resilient latching means, operably associated with said duct and said preset insert, for automatically latching said preset insert in place relative to said duct when said preset insert is moved to said aligned position.

3. The preset insert construction of claim 2, wherein:
    said resilient latching means includes a plurality of flexible barbs formed in said support flange and extending downward therefrom, said barbs being located on said support flange so that when said preset insert is moved to said aligned position, said barbs will snap into said notches thus latching said preset insert to said duct.

4. The preset insert construction of claim 3, wherein:
    said wall of said duct includes a plurality of recesses in which said barbs are initially received when said tabs are inserted into said notches, each of said recesses being spaced from an associated one of said notches by a bridging portion of said wall over which said barbs must deflect as said preset insert is moved to said aligned position.

5. The preset insert construction of claim 1, wherein:
    said duct is further characterized in that said primary perimeter of said access opening is generally rectangular in shape having two generally parallel longer sides and two generally parallel shorter sides, and in that said plurality of notches are arranged in one or more pairs of opposed notches in said longer sides.

6. The preset insert construction of claim 5, wherein:
    said longer sides of said access opening are generally parallel to a length of said duct.

7. The preset insert construction of claim 1, wherein:
    said wall is a top wall of said duct.

8. A preset insert construction for a raceway system for placement in a floor, comprising:
    a duct having an access opening defined in a wall thereof, said access opening having a primary perimeter and a plurality of notches extending beyond said primary perimeter;
    a preset insert having a plurality of tabs arranged to be inserted into said notches thus defining a first position of said preset insert relative to said duct; and
    locking means operably associated with said duct and said preset insert but different than said plurality of tabs for automatically locking said preset insert to said duct in response to said preset insert being moved to a second position relative to said duct.

9. The preset insert construction of claim 8, wherein said locking means includes:

a lateral locking projection on each of said tabs, said lateral projections being located behind said wall when said preset insert is in its said second position; and resilient latch means for automatically latching said preset insert in its said second position.

10. The preset insert construction of claim 9, wherein:

said preset insert includes a support flange abutting said wall of said duct; and said resilient latch means includes a plurality of flexible barbs formed in said support flange and extending downward therefrom, said barbs being located so that when said preset insert is moved to its said second position, said barbs will snap into said notches thus latching said preset insert in its said second position.

11. The preset insert construction of claim 10, wherein:

said wall of said duct includes a plurality of recesses in which said barbs are initially received when said preset insert is in its said first position, each of said recesses being spaced from an associated one of said notches by a bridging portion of said wall over which said barbs must deflect as said preset insert is moved to its said second position.

12. The preset insert construction of claim 8, wherein:

said second position of said preset insert is linearly displaced from said first position thereof relative to said wall of said duct.

13. The preset insert construction of claim 8, wherein:

said duct is further characterized in that said primary perimeter of said access opening is generally rectangular in shape having two generally parallel longer sides and two generally parallel shorter sides, and in that said plurality of notches are arranged in one or more pairs of opposed notches in said longer sides.

14. The preset insert construction of claim 13, wherein:

said longer sides of said access opening are generally parallel to a length of said duct.

15. The preset insert construction of claim 8, wherein: said wall is a top wall of said duct.

16. A method of assembling a raceway system for placement in a floor, said method comprising:

(a) providing a duct having an access opening defined in a wall thereof, said access opening including a plurality of notches;

(b) providing a preset insert having a support flange and a plurality of tabs extending downward below said support flange and arranged to be received in said plurality of notches of said access opening, each of said tabs having a laterally outward extending locking projection defined thereon below said support flange;

(c) inserting said tabs of said preset insert into said notches of said access opening, to define a first position of said preset insert relative to said duct wherein said support flange is located above a plane of said wall and said locking projections are located below said plane of said wall with said locking projections still located directly below said notches;

(d) moving said preset insert to a second position relative to said duct; and (e) automatically resiliently latching said preset insert in its said second position.

17. The method of claim 16, wherein:

said step (b) is further characterized in that said preset insert has an insert opening defined therethrough similar in size and shape to said access opening;

said step (c) is further characterized in that in said first position of said preset insert relative to said duct, said insert opening is partially out of alignment with said access opening; and said step (d) is further characterized in that in said second position of said preset insert said insert opening is substantially aligned with said access opening.

18. The method of claim 17, wherein:

said step (d) is further characterized as sliding said preset insert relative to said duct in a direction generally parallel to said wall.

19. The method of claim 18, wherein:

said step (e) is further characterized in that a means by which said preset insert is mechanically latched in place also resiliently resists movement of said preset insert from its said first position to its said second position; and said step (d) is further characterized as being performed manually with the aid of a manually operated impacting tool.

20. The method of claim 16, wherein:

said step (e) is further characterized in that a mechanical latch attached to said preset insert is received in one or more of said notches of said access opening when said preset insert is in its said second position.

* * * * *